United States Patent
Aldawood et al.

(10) Patent No.: US 12,360,233 B2
(45) Date of Patent: Jul. 15, 2025

(54) GENERATING A SUBTERRANEAN MAP WITH GROUND PENETRATING RADAR

(71) Applicant: Saudi Arabian Oil Company, Dhahran (SA)

(72) Inventors: Ali Aldawood, Safwa (SA); Mohammed Almarzoug, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 758 days.

(21) Appl. No.: 17/373,457

(22) Filed: Jul. 12, 2021

(65) Prior Publication Data

US 2023/0007871 A1 Jan. 12, 2023

(51) Int. Cl.
*G01S 13/88* (2006.01)
*G01S 13/87* (2006.01)

(52) U.S. Cl.
CPC ............ G01S 13/885 (2013.01); G01S 13/87 (2013.01)

(58) Field of Classification Search
CPC ...... G01S 13/003; G01S 13/87; G01S 13/885; G01S 13/89
See application file for complete search history.

(56) References Cited

U.S. PATENT DOCUMENTS

| | | | |
|---|---|---|---|
| 9,398,224 B2 * | 7/2016 | Haldner | H04N 23/69 |
| 2015/0046093 A1* | 2/2015 | Pires De Vasconcelos | G01V 1/307 |
| | | | 702/16 |
| 2015/0153470 A1* | 6/2015 | Stove | G01V 3/18 |
| | | | 702/6 |
| 2018/0074174 A1* | 3/2018 | Beer | G01S 7/539 |
| 2019/0349223 A1* | 11/2019 | Pisupati | G01V 1/366 |

(Continued)

FOREIGN PATENT DOCUMENTS

WO WO-2022248024 A1 * 12/2022

OTHER PUBLICATIONS

Berkhout, A.J.; Blended acquisition with dispersed source arrays; Jul., Aug. 2012; Geophysics, vol. 77, No. 4; pp. A19-A23.*

(Continued)

*Primary Examiner* — Timothy A Brainard
(74) *Attorney, Agent, or Firm* — Fish & Richardson P.C.

(57) ABSTRACT

A system and a method for generating a subterranean map with ground penetrating radar are described. The system includes multiple ground penetrating radar transmitters, multiple ground penetrating radar receivers, and a controller. A first subset of the transmitters radiate a first signal at a first frequency bandwidth, a second subset of the transmitters radiate a second signal at a second frequency bandwidth different than the first frequency bandwidth, and a third subset of the transmitters radiate a third signal at a third frequency bandwidth different than the first and second frequency bandwidths. The receivers receive a first return signal at the first frequency bandwidth, a second return signal at the second frequency bandwidth, and a third return signal at the third frequency bandwidth and transmit the return signals. The controller operates the ground penetrating radar transmitters, receives the return signals, and generates a subterranean map from the return signals.

11 Claims, 6 Drawing Sheets

(56) References Cited

U.S. PATENT DOCUMENTS

2020/0142090 A1* 5/2020 Colombo ............... G01V 3/17
2020/0400805 A1* 12/2020 Sarabandi ........... G01S 13/0209

OTHER PUBLICATIONS

Zu, Shaohuan; Zhou, Hui; Li, Qingqing; Chen, Hanming; Zhang, Qingchen; Mao, Weijian; Chen, Yangkang; Shot-domain deblending using least-squares inversion; Jul., Aug. 2017; Geophysics, vol. 82, No. 4; pp. V241-V256.*

Grasmueck, Mark; Weger, Ralf; Horstmeyer; Full-resolution 3D GPR imaging; Jan., Feb. 2005; Geophysics. vol. 70, No. 1; pp. K12-K19.*

Chen, YangKang; Yuan, Jiang; Jin, Zhaoyu; Chen, Keling; Zhang, Lele; Deblending using normal moveout and median filtering in common-midpoint gathers; 2014; Journal of Geophysics and Engineering 11; 12 pp.*

Zhu, Weiqiang; Huang, Qinghua; Application of reverse time migration on GPR data for detecting internal structures in a sand dune; 2015; SEG New Orleans Annual Meeting; pp. 2269-2274. (Year: 2015).*

Holschuh, Nicholas; Christianson, Knut; Anandakrishnan, Sridhar; Alley, Richard B., Jacobel, Robert W.; Constraining attenuation uncertainty in common midpoint radar surveys of ice sheets; Journal of Geophysical Research: Earth Surface; American Geophysical Union; Oct. 22, 2016; pp. 1876-1890; (Year: 2016).*

Baradello et al., "Multi-offset GPR surveys for complex targets." 9th International Congress of the Brazilian Geophysical Society. European Association of Geoscientists & Engineers, Sep. 2005, 4 pages.

Berkhout, "Blended Acquisition with Dispersed Source Arrays" Geophysics, vol. 77, No. 4, Jul. 2012, 5 pages.

Blacquière et al., "Deblending of dispersed source array data." SEG Technical Program Expanded Abstracts 2012. Society of Exploration Geophysicists, Sep. 2012, 5 pages.

Caporal et al., "Benefits of blended acquisition with dispersed source arrays (DSA)." 77th EAGE Conference and Exhibition 2015. vol. 2015. No. 1. European Association of Geoscientists & Engineers, Jun. 2015, 5 pages.

Caporal et al., "Broadband imaging via direct inversion of blended dispersed source array data." Geophysical Prospecting 66.5, May 2018, 942-953, 12 pages.

Caporal et al., "Seismic acquisition with Dispersed Source Arrays: first results." SEG Technical Program Expanded Abstracts 2015. Society of Exploration Geophysicists, Aug. 2015, 170-175, 6 pages.

Forte et al., "Review of multi-offset GPR applications: Data acquisition, processing and analysis." Signal processing 132, Mar. 2017, 210-220, 11 pages.

Grasmueck et al., "Full-resolution 3D GPR imaging." Geophysics 70.1, Jan. 2005, K12-K19, 9 pages.

Grasmueck et al., "How dense is dense enough for a 'real' 3D GPR Survey?." SEG Technical Program Expanded Abstracts 2003. Society of Exploration Geophysicists, Jan. 2003, 1180-1183, 4 pages.

Ishiyama et al., "Enhancing Productivity Using Blended Acquisition with Temporally Signatured/Modulated and Spatially Dispersed Source Array." Abu Dhabi International Petroleum Exhibition & Conference, Nov. 2019, 12 pages.

Martinez et al., "Modeling dielectric-constant values of geologic materials: An aid to ground-penetrating radar data collection and interpretation." Midcontinent Geoscience, Dec. 2001, 16 pages.

Nakayama et al., "Blended-acquisition design of irregular geometries towards faster, cheaper, safer and better seismic surveying." Geophysical Prospecting 67.6-Geophysical Instrumentation and Acquisition, Jun. 2019, 1498-1521, 24 pages.

Novo et al., "3D GPR in archaeology: what can be gained from dense data acquisition and processing." 12th international conference on ground penetrating radar. vol. 16., Jun. 2008, 5 pages.

Tsingas et al., "3D distributed and dispersed source array acquisition and data processing." The Leading Edge 39.6, Jun. 2020, 392-400, 9 pages.

Yarovoy et al., "UWB array-based sensor for near-field imaging." IEEE Transactions on Microwave Theory and Techniques 55.6, Jun. 2007, 1288-1295, 8 pages.

Zhu et al., "Application of reverse time migration on GPR data for detecting internal structures in a sand dune." SEG Technical Program Expanded Abstracts 2015. Society of Exploration Geophysicists, Aug. 2015, 2269-2274, 6 pages.

Zu et al., "Shot-domain deblending using least-squares inversion." Geophysics 82.4, Jul. 2017, V241-V256, 16 pages.

* cited by examiner

GENERATING A SUBTERRANEAN MAP WITH GROUND PENETRATING RADAR

TECHNICAL FIELD

This disclosure relates to mapping subsurface features, in particular, using ground penetrating radars.

BACKGROUND

The subsurface formations of the Earth sometimes contain subsurface features which can be hazardous to planned subsurface operations such as drilling a wellbore. Generating a subterranean map, such as an image of the subterranean Earth, prior to performing the planned subsurface operation can avoid drilling the wellbore into the hazardous subsurface features.

SUMMARY

This disclosure describes system and methods related to generating a subterranean map with ground penetrating radar.

This approach generates a subterranean map by simultaneously emitting multiple ground penetrating radar signals from multiple antennas at multiple different frequencies into the subsurface formations of the Earth. The transmitted ground penetrating radar signals interact with subsurface features creating multiple ground penetrating radar return signals, each at different frequencies. The ground penetrating radar return signals are received at multiple ground penetrating radar receivers. The ground penetrating radar return signals are separated and a subterranean map is generated from the ground penetrating radar return signals.

In one aspect, ground penetrating radar systems include multiple ground penetrating radar transmitters, multiple ground penetrating radar receivers, and a controller. The ground penetrating radar transmitters include a first subset of ground penetrating radar transmitters operable to radiate a first signal at a first frequency bandwidth, a second subset of ground penetrating radar transmitters operable to radiate a second signal at a second frequency bandwidth different than the first frequency bandwidth, and a third subset of ground penetrating radar transmitters operable to radiate a third signal at a third frequency bandwidth different than the first frequency bandwidth and the second frequency bandwidth. Each of the ground penetrating radar receivers are operable to receive a first return signal at the first frequency bandwidth, a second return signal at the second frequency bandwidth, and a third return signal at the third frequency bandwidth and transmit the first return signal, the second return signal, and the third return signal. The controller is operable to operate the ground penetrating radar transmitters, receive the first return signal, the second return signal, and the third return signal from the ground penetrating radar receivers, and generate a subterranean map from the first return signal, the second return signal, and the third return signal.

In some embodiments, each of the ground penetrating radar receivers is co-located with a corresponding transmitter. In some cases, each of the ground penetrating radar receivers receives a signal from the co-located transmitter and another signal from at least one other of the transmitters. In some cases, each pair of the co-located ground penetrating radar transmitters and ground penetrating radar receivers are separated by a distance of between 0.25 meters and 1 meter.

In some embodiments, the controller includes a least-square inversion module and a bandpass filter operable to deblend the first return signal, the second return signal, and the third return signal.

In some embodiments, the controller is further operable to generate the subterranean map by flattening a common mid-point of the first return signal, the second return signal, and the third return signal. In some cases, the controller includes an operator to flatten the common mid-point of the first return signal, the second return signal, and the third return signal. The operator can include a normal moveout velocity analysis module.

In some embodiments, the controller is further operable to generate the subterranean map by enhancing a first signal to noise ratio of the first return signal, a second signal to noise ratio of the second return signal, and a third signal to noise ratio of the third return signal.

In some embodiments, the controller includes a migration module to generate a high-resolution image of the subterranean map. In some cases, the migration module includes a Kirchhoff migration module to generate the high-resolution image of the subterranean map. In some cases, the migration module includes a reverse time migration module to generate the high-resolution image of the subterranean map.

In some embodiments, the first frequency bandwidth, the second frequency bandwidth, and the third frequency bandwidth are between 10 MHz and 3 GHz. In some cases, the first frequency bandwidth, the second frequency bandwidth, and the third frequency bandwidth are at least one of 10 MHz, 25 MHz, 50 MHz, 100 MHz, 200 MHz, 400 MHz, 800 MHz, and 1 GHz.

In another aspect, generating a subterranean map with a ground penetrating radar includes: simultaneously emitting a first ground penetrating radar signal from a first transmitting antenna at a first frequency bandwidth, a second ground penetrating radar signal from a second transmitting antenna at a second frequency bandwidth different than the first frequency bandwidth, and a third ground penetrating radar signal from a third transmitting antenna at a third frequency bandwidth different than the first frequency bandwidth and the second frequency bandwidth; receiving a first ground penetrating radar return signal produced in response to the first ground penetrating radar signal interacting with a subsurface feature, a second ground penetrating radar return signal produced in response to the second ground penetrating radar signal interacting with the subsurface feature, and a third ground penetrating radar return signal produced in response to the third ground penetrating radar signal interacting with the subsurface feature at a first ground penetrating radar receiver, a second ground penetrating radar receiver, and a third ground penetrating radar receiver; separating the first ground penetrating radar return signal, the second ground penetrating radar return signal, and the third ground penetrating return signal; and generating a subterranean map from the first ground penetrating radar return signal, the second ground penetrating radar return signal, and the third ground penetrating radar return signal.

In some embodiments, the first ground penetrating radar signal, the second ground penetrating radar signal, and the third ground penetrating radar signal interacting with the subsurface feature includes the first ground penetrating radar signal, the second ground penetrating radar signal, and the third ground penetrating radar signal interacting with the subsurface feature reflecting, refracting, or backscattering off the subsurface feature.

In some embodiments, the subsurface feature is a karst or a pipeline.

In some embodiments, the first transmitting antenna is co-located with the first ground penetrating radar receiver, the second transmitting antenna is co-located with the second ground penetrating radar receiver, and the third transmitting antenna is co-located with the third ground penetrating radar receiver.

In some embodiments, generating the subterranean map from the first ground penetrating radar return signal, the second ground penetrating radar return signal, and the third ground penetrating radar return signal includes deblending the first ground penetrating radar return signal, the second ground penetrating radar return signal, and the third ground penetrating radar return signal by a least-square inversion module, a median filtering, and a bandpass filter.

In some embodiments, generating the subterranean map from the first ground penetrating radar return signal, the second ground penetrating radar return signal, and the third ground penetrating radar return signal includes flattening a common mid-point of the first ground penetrating radar return signal, the second ground penetrating radar return signal, and the third ground penetrating radar return signal by a normal moveout velocity analysis module.

Implementations of the present disclosure can realize one or more of the following advantages. These systems and methods can reduce the acquisition time for collecting return signals from subsurface features. For example, using multiple sources at different locations to emit different frequencies simultaneously and receivers to receive and record the different frequencies simultaneously can reduce the acquisition time to survey a large area.

These systems and methods can enhance the resolution of an image reconstructed from the return signals. For example, receiving and separating the return signals to generate the subterranean map at multiple frequencies from different directions from the subsurface features can enhance the resolution of the image reconstructed from the return signals. For example, this approach can increase the return signal to noise ratio and resolution of the generated image. These systems and methods can increase the depth range at which the subterranean maps (images generated from the acquired return signals) are generated. For example, the number of return signals received from subsurface features at different shallow depths can be increased. For example, the resolution of the image can be enhanced by imaging the blended return signals from a complex subsurface feature by reverse time migration which can solve a combined wave-equation from simultaneous sources.

These systems and methods can improve the identification of drilling hazards. For example, when the subsurface features are a drilling hazard, increasing the depth range and enhancing the image resolution can improve the identification of drilling hazards. These systems and methods can also increase environmental safety. For example, repositioning the planned location of a wellbore (i.e., a proposed oil and gas well) to avoid a subterranean drilling hazard reduce the likelihood of a hazardous event from occurring. These systems and methods can image the subsurface with both non-invasive and non-destructive methods. For example, ground penetrating radar surveys can be safely conducted in public places and around people. For example, ground penetrating radar surveys can be safely conducted in oil fields where wellbores are being actively drilled.

These systems and methods can improve archaeologic mapping. For example, ground penetrating radar sources simultaneously emitting frequencies bandwidths that travel at various depths can generate different high quality images at different depths. The illumination of the subsurface at different angles can increase the accuracy of locating geological features and man-made archeologic objects in a time-efficient manner.

These system and methods can improve infrastructure mapping. For example, obtaining a high-resolved image of the subsurface in the vicinity of crucial infrastructure can accurately identify critical subsurface infrastructure components.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure relates to generating a subterranean map with a ground penetrating radar.

This approach generates a subterranean map with a ground penetrating radar. The subterranean map is generated by first simultaneously emitting multiple ground penetrating radar signals from multiple antennas at multiple frequencies into the subterranean Earth. The transmitted ground penetrating radar signals interact with subsurface features. The interaction of the transmitted ground penetrating radar signals and the subsurface features creates multiple ground penetrating radar return signals, each spanning different frequency bandwidths. The ground penetrating radar return signals are received at multiple ground penetrating radar receivers. The ground penetrating radar return signal are separated and a subterranean map is generated from the ground penetrating radar return signals.

The initial stages of drilling a wellbore in an exploratory area include studying the near-surface geology to minimize risk of early drilling failures due to encountering a shallow (i.e. closer to the surface) subsurface feature which can be hazardous when the wellbore contacts the subsurface feature. For example, the hazardous subsurface feature can be between the surface of the Earth to a depth of approximately 50 meters. Ground penetrating radar can detect objects up to a depth of 50 meters, especially in the presence of subsurface materials with low conductivity. The hazardous subsurface feature can be referred to as a near surface complexity. The subsurface features can be karsts, faults, un-located pipelines, un-located wellbores, mines, tunnels, or boulders.

Figure 1A:
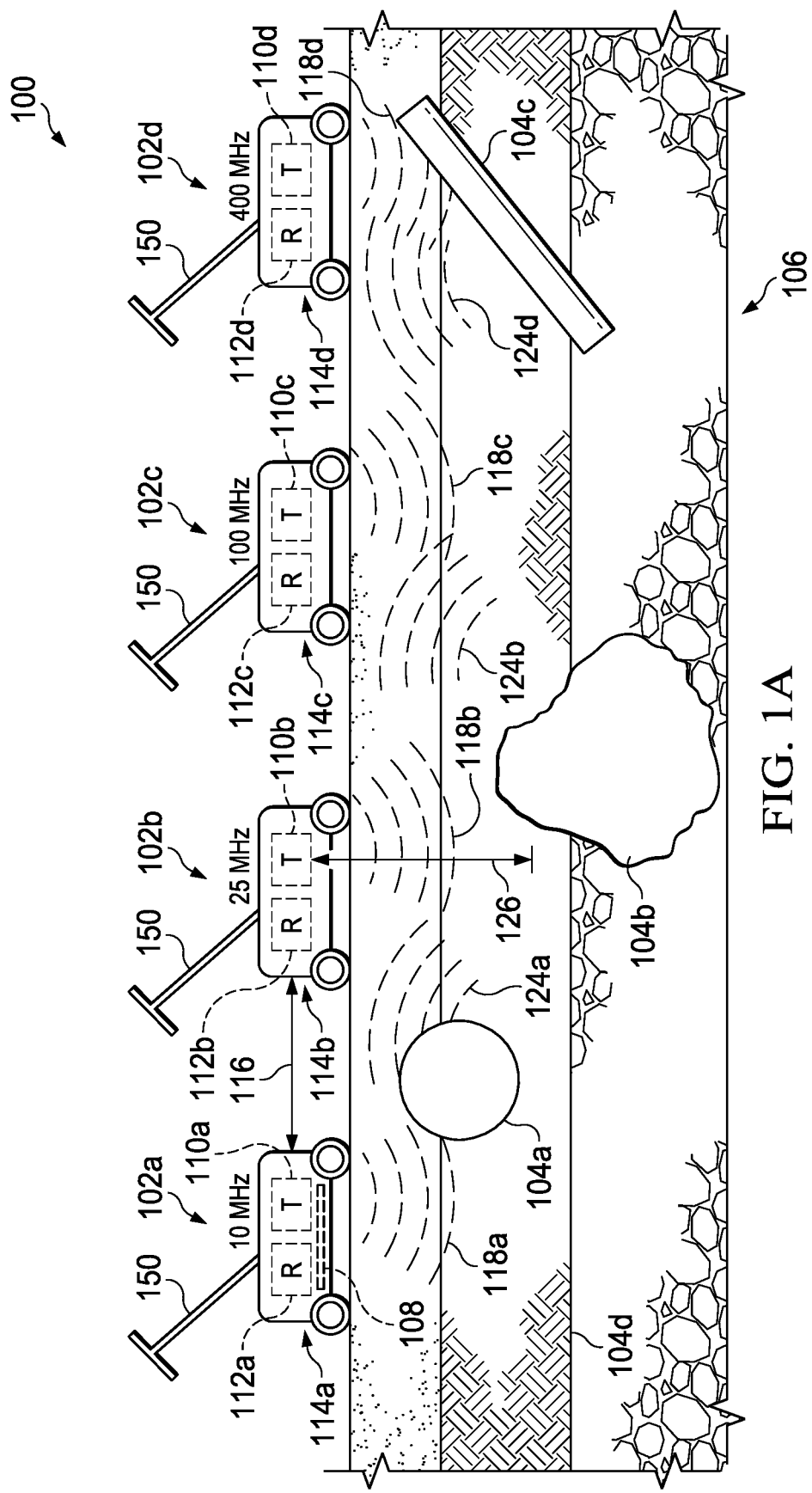
FIGS. 1A and 1B are schematic views of a ground penetrating radar system for generating a subterranean map deployed in the field.
Figure 1B:
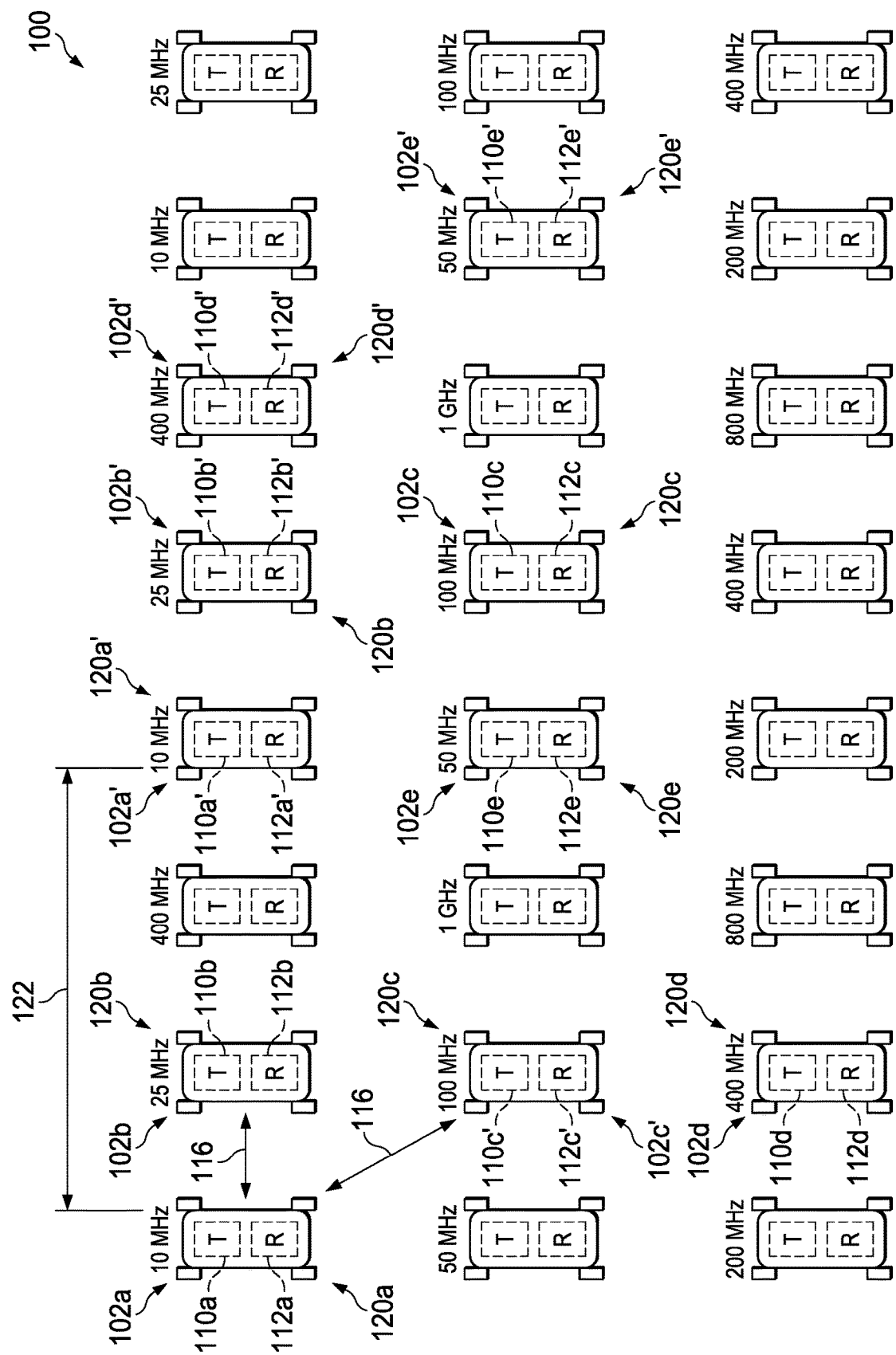
Figure 2:
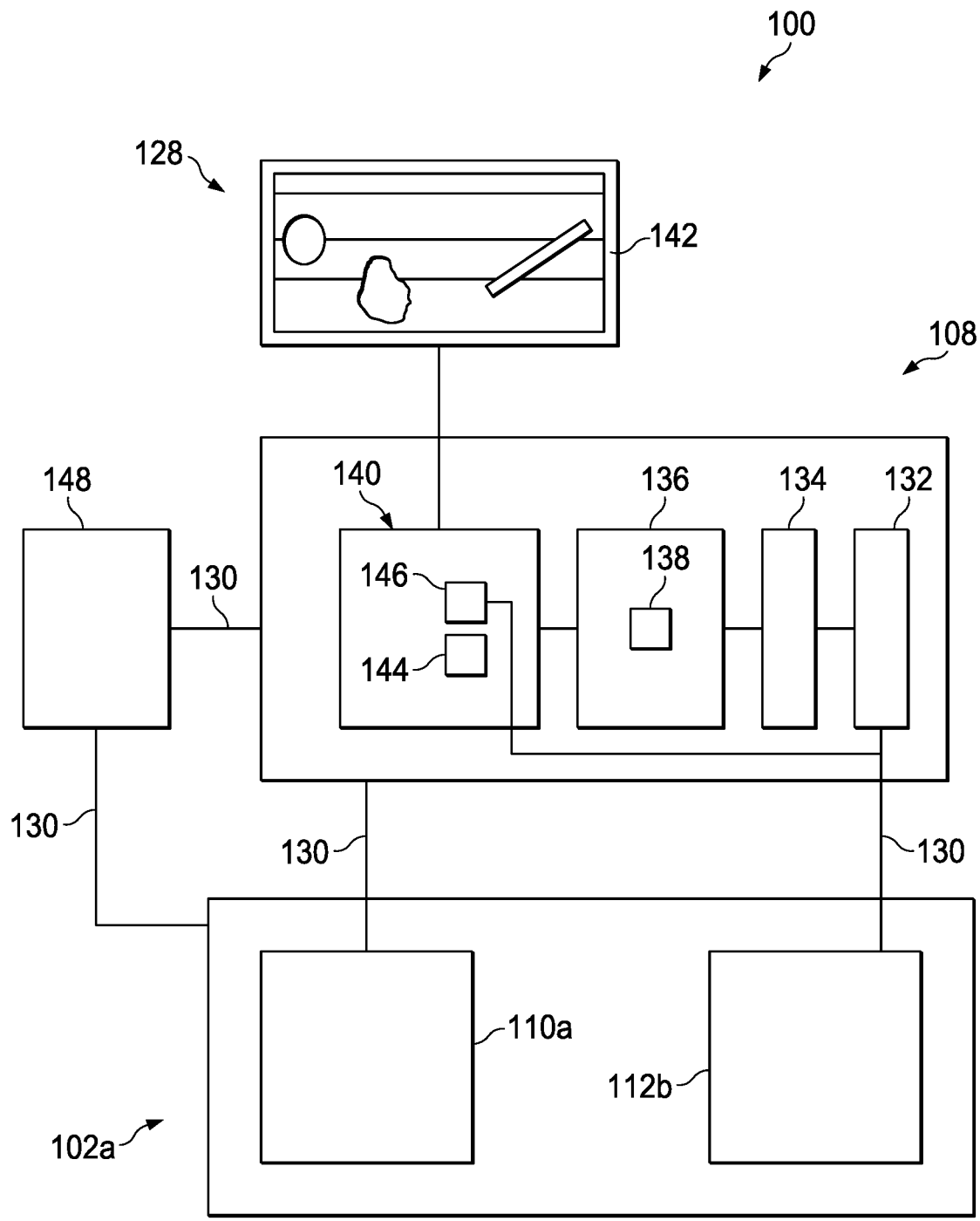
FIG. 2 is a block diagram of the ground penetrating radar system of FIG. 1A.

FIGS. 1A and 1B are schematic views of a ground penetrating radar system 100 for generating a subterranean map deployed in the field. FIG. 2 is a block diagram of the ground penetrating radar system 100 of FIG. 1A. The ground penetrating radar system 100 has multiple ground penetrating radar devices 102*a-e* to detect subsurface features 104*a-d* in the subterranean Earth 106 and a controller 108 to operate the ground penetrating radar devices 102*a-d* and generate a subterranean map 128 (described below in reference to FIG. 2).

The ground penetrating radar system 100 generates the subterranean map 128. The ground penetrating radar system 100 has multiple ground penetrating radar transmitters 110*a*-110*e* and 110*a*'-110*e*'. A first subset 120*a* of the ground penetrating radar transmitters 110*a* and 110*a*' radiate a first signal at a first frequency bandwidth. A second subset 120*b* of the ground penetrating radar transmitters 110*b* and 110*b*' radiate a second signal at a second frequency bandwidth different than the first frequency bandwidth. A third subset 120*c* of the ground penetrating radar transmitters 110*c* and 110*c*' radiate a third signal at a third frequency bandwidth different than the first frequency bandwidth and the second frequency bandwidth. A fourth subset 120*d* of the ground penetrating radar transmitters 110*d* and 110*d*' radiate a fourth signal at a fourth frequency bandwidth different than the first frequency bandwidth, the second frequency bandwidth, and the third frequency bandwidth. A fifth subset 120*e* of the ground penetrating radar transmitters 110*e* and 110*e*' radiate a fifth signal at a fifth frequency bandwidth different than the first frequency bandwidth, the second frequency bandwidth, the third frequency bandwidth, and the fourth frequency bandwidth.

The ground penetrating radar system 100 has multiple ground penetrating radar receivers 112*a*-112*e* and 112*a*'-112*e*' to receive a first return signal at the first frequency bandwidth, a second return signal at the second frequency bandwidth, and a third return signal at the third frequency bandwidth. The ground penetrating radar receivers 112*a*-112*e* and 112*a*'-112*e*' transmit the first return signal, the second return signal, and the third return signal to the controller 108 (shown in FIG. 1A). The controller 108 operates the ground penetrating radar transmitters 110*a*-110*e* and 110*a*'-110*e*' and receive the first return signal, the second return signal, and the third return signal from the ground penetrating radar receivers 112*a*-112*e* and 112*a*'-112*e*'. The controller 108 generates the subterranean map 128 by processing the return signals.

The subsurface features 104*a-d* can be hazardous to planned subterranean operations such as drilling, infrastructure building, and underground utility wiring. The subsurface feature 104*a* is an ore body. The ore body can have a high conductivity relative to the subterranean Earth 106 surrounding the ore body. The ore body can have a material hardness greater than the surrounding subterranean Earth 106. During a drilling operation, a drill string (not shown) drilling a wellbore (not shown) can contact the subterranean feature 104*a* ore body, damaging the drill string. Damaging the drill string can be avoided by drilling around the subterranean feature 104*a* ore body or drilling the wellbore in a different location to avoid the subterranean feature 104*a* ore body. The subsurface feature 104*b* is a karst, which is a subterranean void. The karst can be filled with fluids. During the drilling operation, the drill string drilling the wellbore can enter the karst causing a portion of the wellbore to collapse. The subsurface feature 104*c* is an abandoned portion of a pipeline. During the drilling operation, the drill string drilling the wellbore can contact the abandoned portion of the pipeline, damaging the drill string. The subsurface feature 104*d* is a subsurface layer, that is, a barrier or separation between two different types of geologic formations. Different types of geologic formations have different properties. The ground penetrating radar system 100 can detect the subsurface layer (the subsurface feature 104*d*), including the boundaries and interferences, when enough contrast in electrical properties between the two formations is present. A fault (not shown) is a break in the subterranean Earth 106, where the formation or formations have a displacement between broken portions of the formations. Faults can cause an accumulation in stresses in the broken region of the subterranean Earth 106. Faults can be detected using the ground penetrating radar system 100. Detecting faults with the ground penetrating radar system 100 can allow an operator to avoid drilling through the fault or to approach the fault with the drill string with caution. In some cases, faults may enhance the flow of hydrocarbons contained within the subterranean Earth 106. During the drilling operation, the drill string drilling the wellbore can contact the fault, damaging the drill string. Generating a subterranean map with the ground penetrating radar system 100 can allow an operator to change the site of a planned wellbore to avoid the subsurface features 104*a-d*.

Each of the ground penetrating radars 102*a-e* have a respective transmitter 110*a-e* co-located with a respective receiver 112*a-d*. The transmitter 110*a* and the receiver 112*a* contained in the ground penetrating radar device 102*a* are co-located as a first transmitter-receiver pair. Likewise, transmitter 110*b* and receiver 112*b* contained in the ground penetrating radar device 102*b* are co-located as a second transmitter-receiver pair. Transmitter 110*c* and receiver 112*c* contained in the ground penetrating radar device 102*c* are co-located as a third transmitters-receiver pair. Transmitter 110*d* and receiver 112*d* contained in the ground penetrating radar device 102*d* are co-located as a fourth transmitter-receiver pair. In some cases, transmitter 110*a* and the receiver 112*a* are separated by a distance of 5 centimeters to 1 meter.

The ground penetrating radars 102*a-e* can be positioned in vehicles 114*a-d* which are mobile to position and reposition the ground penetrating radar 102*a-e*. In some cases, each of the vehicles 114*a-d* include a handle 150. The handle 150 allows an operator to manually re-position the respective vehicle 114*a-d*.

Referring to FIGS. 1A-1B, a distance 116 separates each adjacent ground penetrating radar device 102*a*-102*e* from the other ground penetrating radars 102*a-e* (e.g., ground penetrating radar device 102*a* and ground penetrating radar device 102*b*). The distance 116 can be between 0.25 meters and 1 meter. The distance 116 is a minimum distance between at least two ground penetrating radar devices 102*a-e* operating at different frequencies as described below. The distance 116 between two adjacent ground penetrating radar devices 102*a*-102*d* can depend on the objective of the survey operation. A sparse survey can be conducted using a distance 116 larger than a threshold nominal distance between two adjacent ground penetrating device 102*a*-102*d*, but for a dense survey the distance 116 can be smaller than the threshold nominal distance. The dense survey can increase the illumination of the subsurface for better subsurface imaging and subterranean mapping.

Each of the transmitters 110*a-d* transmit a respective ground penetrating radar signal 118*a-d* simultaneously into the subterranean Earth 106. The ground penetrating radar transmitter 110*a* is operable to radiate the ground penetrating radar signal 118*a* at a first frequency bandwidth. The ground penetrating radar transmitter 110*b* is operable to radiate the ground penetrating radar signal 118*b* at a second frequency bandwidth different than the first frequency bandwidth. The ground penetrating radar transmitter 110*c* is operable to radiate the ground penetrating radar signal 118c at a third frequency bandwidth different than the first and second frequency bandwidths. The ground penetrating radar transmitter 110d is operable to radiate the ground penetrating radar signal 118d at a fourth frequency bandwidth different than the first, second, and third frequency bandwidths.

The first frequency, the second frequency, and the third frequency bandwidths can be between 10 MHz and 1.6 GHz. In some cases, such as the presence of a highly conductive material in the subterranean Earth 106 which will drastically attenuate electromagnetic energy, then lower central frequencies may need to be used.

In one example, the first frequency, the second frequency, and the third frequency bandwidths can be at least one of 10 MHz, 25 MHz, 50 MHz, 100 MHz, 200 MHz, 400 MHz, 800 MHz, and 1 GHz. For example, as shown in FIGS. 1A-1B, the ground penetrating radar device 102a transmits the ground penetrating radar signal 118a at 10 MHz, the ground penetrating radar device 102b transmits the ground penetrating radar signal 118b at 25 MHz, the ground penetrating radar device 102c transmits the ground penetrating radar signal 118c at 100 MHz, and the ground penetrating radar device 102d transmits the ground penetrating radar signal 118d at 400 MHz.

Referring to FIG. 1B, two or more ground penetrating radars, such as 102a and 102a', can both be operable to radiate at the same frequency bandwidth (e.g., 10 MHz). When two or more ground penetrating radars, such as 102a and 102a', are operable to radiate at the same frequency, ground penetrating radars 102a-102a' are the first subset 120a. Each of the ground penetrating radars 102a-102a' in the first subset 120a are separated by a distance 122, which is greater than the distance 116. In some cases, the distribution of a central frequency of the frequency bandwidth of the first subset 120a (the ground penetrating radars devices 102a and 102a') are randomly placed, that is, an arrangement (a pattern) between the pair of ground penetrating radar devices 102a and 102a' are generally random, but still at a distance 122 between the ground penetrating radar devices 102a and 102a' of the first subset 120a.

As shown in FIG. 1B, ground penetrating radar devices 102b and 102b' are the second subset 120b operable to radiate at the same frequency bandwidth of 25 MHz. Ground penetrating radar devices 102c and 102c' are the third subset 120c operable to radiate at the same frequency bandwidth of 100 MHz. Ground penetrating radars devices 102d and 102d' are the fourth subset 120d operable to radiate at the same frequency bandwidth of 400 MHz.

The ground penetrating radar system 100 can include additional subsets each operable at different frequencies. For example, as shown in FIG. 1B, the fifth subset 120e has ground penetrating radars 102e and 102e' which are operable to radiate at a frequency bandwidth of 50 MHz. The number of ground penetrating radars 102a-e and number of subsets 120a-120e included in the ground penetrating radar system 100 depend on the size of the area of interest (i.e., the size of the geographic area to be surveyed) and a desired imaging depth.

Referring to FIGS. 1A-1B, at least one of the ground penetrating radar signals 118a-118d interact with the subsurface features 104a-104d to generate first and second return signals 124a-b and a third return signal 124d from subsurface features 104a-d which are within a depth detection range 126 from the respective ground penetrating radar transmitter 110a-b and 110d. No subsurface feature 104a-d is within in the depth detection range 126 of transmitter 110c, so the ground penetrating radar signal 118c may interact with any of the subsurface features 104a-d. For example, the ground penetrating radar signal 118c may interact with any subsurface feature 104a-d (whether it is just layers, buried objects, etc.) whenever there is a difference in electromagnetic property large enough to be detected. The return signals 124a-b and 124d can be reflected, refracted, or backscattered from the subsurface features 104a-104d.

Each of the ground penetrating radar receivers 112a-d are operable to receive the first return signal 124a at the first frequency bandwidth, the second return signal 124b at the second frequency bandwidth, and the third return signal 124d at the third frequency bandwidth. In some cases, each of ground penetrating radar receivers 112a-d receive a return signal generated from ground penetrating radar signal of the co-located transmitter interacting with at least one of the subsurface features 104a-d and another return signal from at least one other the ground penetrating radar transmitters 110a-d. For example, as shown in FIG. 1A, the ground penetrating radar receiver 112b of the ground penetrating radar device 102b receives the first return signal 124a generated from the interaction of the ground penetrating radar signal 118a with subsurface feature 104a and the second return signal 124b generated from the interaction of the ground penetrating radar signal 118b with subsurface feature 104a. The second return signal 124b is generated from the interaction of the ground penetrating radar signal 118b transmitted from the ground penetrating radar transmitter 110b co-located with ground penetrating radar receiver 112b and the subsurface feature 104b. Each of the ground penetrating radar receivers 112a-d are operable to receive the first return signal 124a, the second return signal 124b, and the third return signal 124d.

Referring to FIG. 2, the ground penetrating radar device 102a has the ground penetrating radar transmitter 110a and the ground penetrating radar receiver 112a as previously described. The controller 108 operates the ground penetrating radars 102a-e and generate a subterranean map 128.

The controller 108 is electronically coupled to the ground penetrating radar transmitter 110a and the ground penetrating radar receiver 112a. In some cases, as shown in FIG. 2, the controller 108 is electronically coupled to the ground penetrating radar transmitter 110a by a control cable 130. The control cable 130 transmits and receives command signals and status signals from the ground penetrating radar transmitter 110a. Alternatively, the controller 108 can remotely transmit command signals and status signals to and from the ground penetrating radar transmitter 110a. For example, the controller 108 can transmit and receive command signals and status signals by radio to and from the ground penetrating radar transmitter 110a. As shown in FIG. 2, the controller 108 operates the ground penetrating radar transmitter 110a. The controller 108 commands the ground penetrating radar transmitter 110a to transmit the ground penetrating radar signal 118a at the first frequency bandwidth for a preselected duration and at a preselected power. The controller 108 operates the ground penetrating radar transmitter 110b-d substantially similarly to ground penetrating radar transmitter 110a.

The controller 108 receives the first return signal 124a, the second return signal 124b, and the third return signal 124d from the ground penetrating radar receivers 112a-e. The controller 108 can receive the return signals 124a-c through another control cable 130.

The controller 108 separates and processes the return signals 124a-b and 124d and generates the subterranean map 128 from the first return signal 124a, the second return signal 124b, and the third return signal 124d. The first return signal 124a, the second return signal 124b, and the third return signal 124d are blended as a result of the ground penetrating radar signals 118a-d being transmitted simultaneously. Since the return signals 124a-b and 124d can be reflected, refracted, or backscattered from the subsurface features 104a-104d and the return signals 124a-b and 124d are blended, the subterranean map 128 generated from the raw data (the unprocessed return signals 124a-b and 124d) can appear unfocused and therefore can be a misleading image of the subsurface features 104a-104d, especially in case of complex shallow subsurface features 104a-104d. The complex subsurface features 104a-d can include faults, folds, karsts, and salt bodies. The near surface can be within the approximately the first 50 meters from the Earth's surface.

Referring to FIG. 2, the controller 108 can have a least-square inversion module 132 and a bandpass filter 134 to deblend the return signals 124a-b and 124d and reduce noise caused by interferences. In some cases, reducing noise caused by interferences can increase the signal to noise ratio (i.e., a ratio between the return signals 124a-b and 124d sound level to a background noise level), which can result in sharper images and improved detail of the subsurface features 104a-d in the subterranean map 128.

Figure 3A:
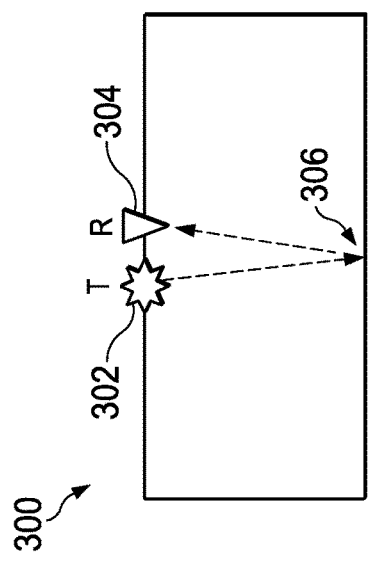
FIGS. 3A-3D are schematic views of multiple ground penetrating radar transmitter and receiver arrangements.

FIGS. 3A-3D are schematic views of multiple ground penetrating radar transmitter and receiver arrangements. FIG. 3A is a schematic view 300 of a single ground penetrating radar transmitter 302 and a single ground penetrating radar receiver 304 arranged with a single common offset (single fold) 306.

Figure 3B:
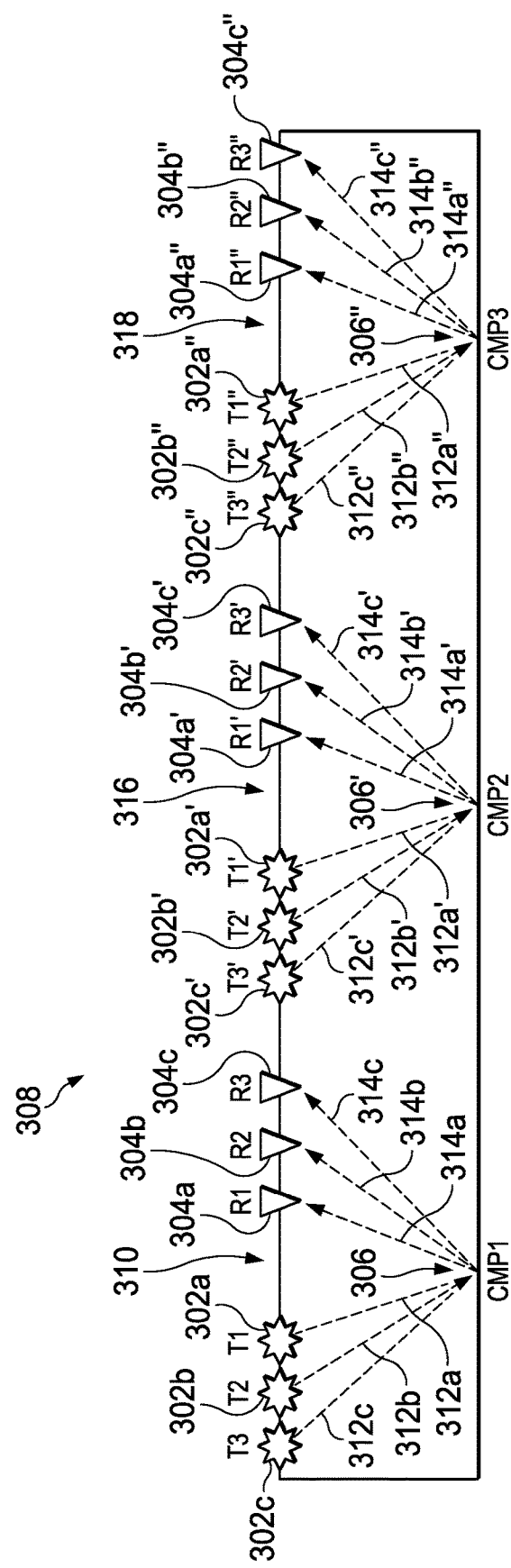

FIG. 3B is a schematic view 308 of multiple ground penetrating radar transmitters 302a-c (T1-T3) and a multiple ground penetrating radar receiver 304a-c (R1-R3) arranged with a single common mid-point 306 (CMP1). With the ground penetrating radar transmitters 302a-c and the ground penetrating radar receivers 304a-c at a first location 310, this arrangement focuses the three transmitted signals 312a-c on the single common mid-point 306. Three return signals 314a-c are transmitted back to the three separate ground penetrating radar receivers 304a-c.

The process is repeated with the ground penetrating radar transmitters 302a-c and the ground penetrating radar receivers 304a-c are moved to a second location 316. The ground penetrating radar transmitters 302a-c are now 302a'-c' and the ground penetrating radar receivers 304a-c are now 304a'-c'. This arrangement focuses three transmitted signals 312a'-c' on the common mid-point 306'. Three return signals 314a'-c' are transmitted back to the three separate ground penetrating radar receivers 304a'-c'.

The process is repeated again with the ground penetrating radar transmitters 302a-c and the ground penetrating radar receivers 304a-c are moved to a third location 318. The ground penetrating radar transmitters 302a-c are now 302a"-c" and the ground penetrating radar receivers 304a-c are now 304a"-c". This arrangement focuses three transmitted signals 312a"-c" on the common mid-point 306". Three return signals 314a"-c" are transmitted back to the three separate ground penetrating radar receivers 304a"-c".

Figure 3C:
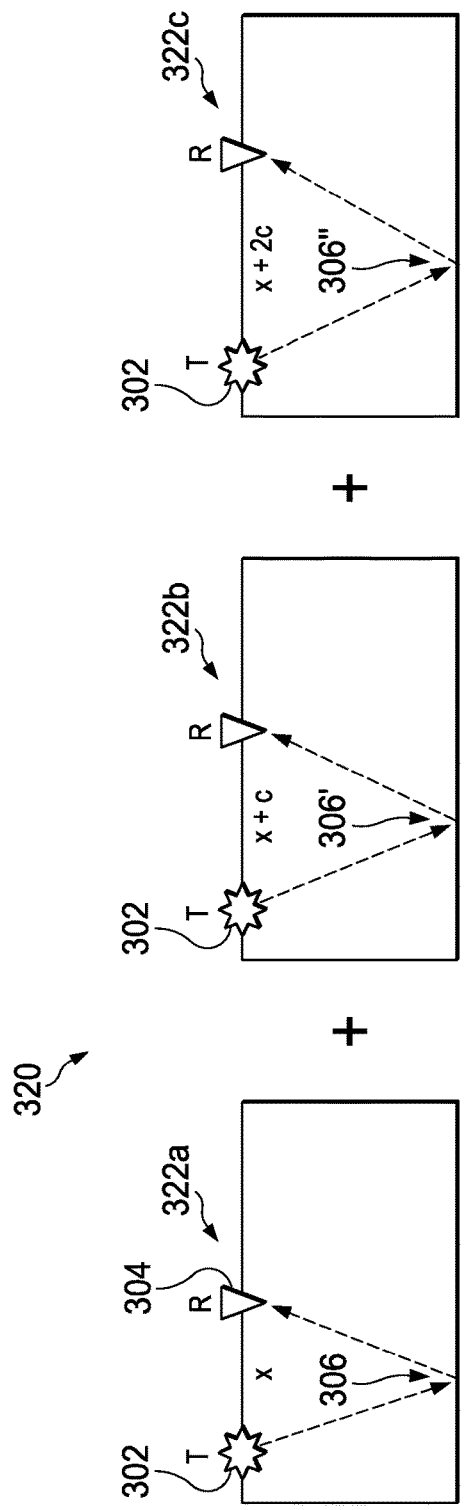

FIG. 3C is a schematic view 320 of a single ground penetrating radar transmitter 302 and a single ground penetrating radar receiver 304 arranged with the ground penetrating radar receiver 304 at multiple locations 322a-c to adjust the single mid-point from 306 to 306", respectively. This arrangement can be referred to as a common shot gather. The ground penetrating radar transmitter 302 is at a distance "x" from the single ground penetrating radar receiver 304. The distance "x" between the single ground penetrating radar transmitter 302 and the ground penetrating radar receiver 304 is increased by moving the ground penetrating radar receiver 304 by a constant "C" and then moving it again by "2C." The received signals are from different common mid-points (i.e., CMP1 306, CMP2 306', and CMP3 306").

Figure 3D:
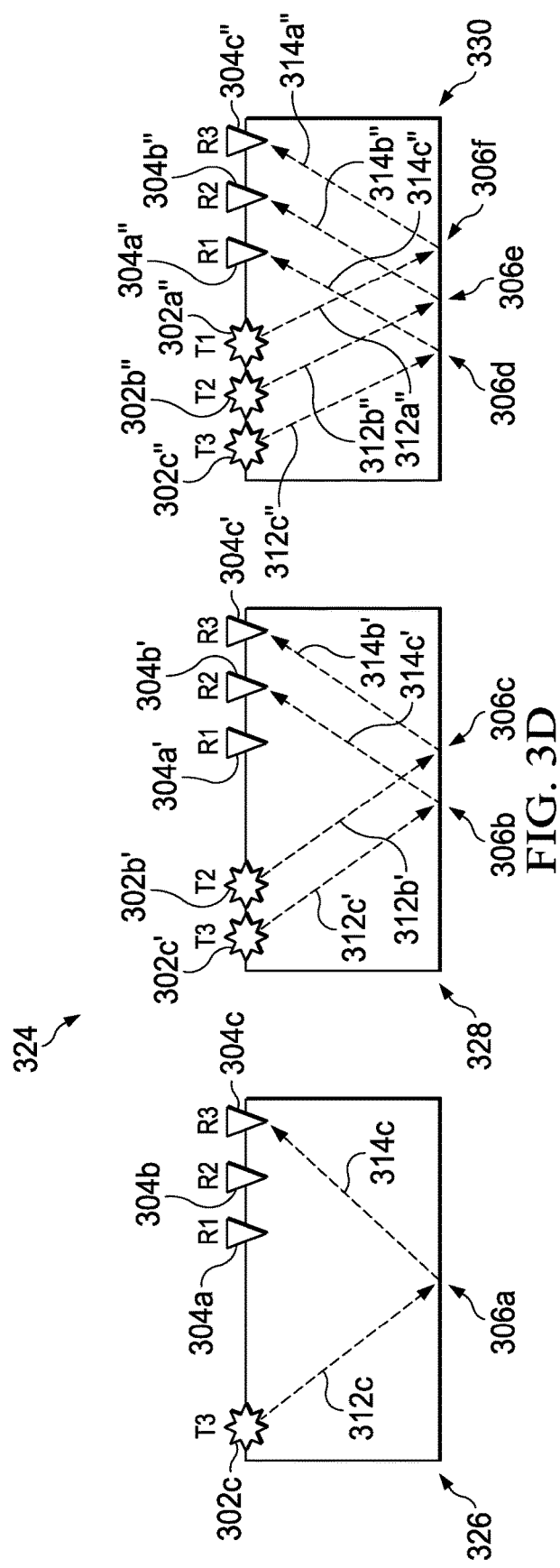

FIG. 3D is a series of schematic view 324 of multiple ground penetrating radar transmitters 302a-c (T1-T3) and a multiple ground penetrating radar receiver 304a-c (R1-R3) arranged with multiple mid-points 306a-306f. First, in section 326 at a first time, only the ground penetrating radar transmitter 302c transmits a ground penetrating radar signal 312c to a single mid-point 306a. A first return signal 314a is generated and transmitted to the ground penetrating radar receiver 304c. The first return signal 314c is not received at the ground penetrating radar receivers 304a, 304b.

Second, in section 328, at a second time different than the first time, the ground penetrating radar transmitters 302b', 302c' each transmit ground penetrating radar signals 312c', 312b' to different single mid-points 306b, 306c, respectively. A return signal 314c' is generated by the ground penetrating radar signal 312c' and transmitted to the ground penetrating radar receiver 304b'. A return signal 314b' is generated by the ground penetrating radar signal 312b' and transmitted to the ground penetrating radar receiver 304c'.

Third, in section 330, at a third time different than the first and second times, the ground penetrating radar transmitters 302a"-c" each transmit ground penetrating radar signals 312a"-c" to different single mid-points 306d-f. The ground penetrating radar transmitter 302a" transmits ground penetrating radar signal 312a" to mid-point 306f. A return signal 314a" is generated by the ground penetrating radar signal 312a" and is transmitted to the ground penetrating radar receiver 304c". The ground penetrating radar transmitter 302b" transmits ground penetrating radar signal 312b" to mid-point 306e. A return signal 314b" is generated by the ground penetrating radar signal 312b" and is transmitted to the ground penetrating radar receiver 304b". The ground penetrating radar transmitter 302c" transmits ground penetrating radar signal 312c" to mid-point 306d. A return signal 314c" is generated by the ground penetrating radar signal 312c" and is transmitted to the ground penetrating radar receiver 304a". This arrangement can be referred to as a common offset gather.

Referring to FIGS. 2 and 3A-D, the controller 108 can have a median filter 136 to deblend the first return signal 124a, the second return signal 124b, and the third return signal 124d. Referring to FIG. 2, a normal moveout velocity analysis module 138 can subsequently flatten the return signals 124a-b and 124d.

The controller 108 can have migration module 140 to generate a high-resolution image 142 of the subterranean map 128. The migration module 140 can have a Kirchhoff migration module 144 to further generate the high-resolution image.

The migration module 140 can have a reverse time migration module 146 to further generate the high-resolution image. The reverse time migration module 146 can solve a wave equation for simultaneous ground penetrating radar sources transmitting ground penetrating radar signals. In some cases, the blended data (the return signals 124a-b and 124d) can input directly into the reverse time migration module 146 to apply the deblending process to the return signals 124a-b and 124d.

The ground penetrating radar system 100 has a power source 148 electrically connected to the controller 108 and the ground penetrating radars 102*a-e*. For example, the power source 148 can be a generator or a gel cell battery.

Figure 4:
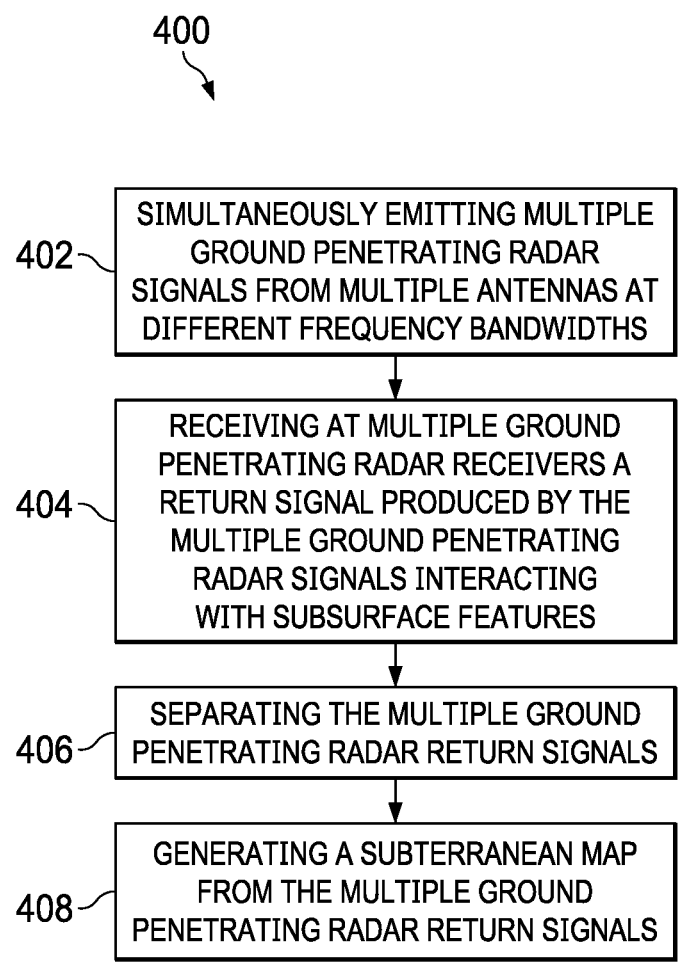
FIG. 4 is a flow chart of an example method of generating a subterranean map with a ground penetrating radar.

FIG. 4 is a flow chart 400 of an example method of generating a subterranean map with a ground penetrating radar according to the implementations of the present disclosure. At 402, simultaneously, multiple ground penetrating radar signals at different frequencies are emitted from multiple antennas. A first ground penetrating radar signal is emitted from a first transmitting antenna at a first frequency bandwidth, a second ground penetrating radar signal is emitted from a second transmitting antenna at a second frequency bandwidth different than the first frequency bandwidth, and a third ground penetrating radar signal is emitted from a third transmitting antenna at a third frequency bandwidth different than the first frequency bandwidth and the second frequency bandwidth. Referring to FIGS. 1A-1B, each of the transmitters 110*a-d* transmit the respective ground penetrating radar signals 118*a-d* simultaneously into the subterranean Earth 106 at different frequency bandwidths. The first frequency, the second frequency, and the second frequency bandwidths can be between 10 MHz and 1.6 GHz. The different frequencies can be one of 10 MHz, 25 MHZ, 50 MHz, 100 MHZ, 200 MHz, 400 MHZ, 800 MHz, and 1 GHz.

At 404, a first ground penetrating radar return signal produced in response to the first ground penetrating radar signal interacting with a subsurface feature, a second ground penetrating radar return signal produced in response to the second ground penetrating radar signal interacting with the subsurface feature, and a third ground penetrating radar return signal produced in response to the third ground penetrating radar signal interacting with the subsurface feature are received at a first ground penetrating radar receiver, a second ground penetrating radar receiver, and a third ground penetrating radar receiver. The first transmitting antenna can be co-located with the first ground penetrating radar receiver, the second transmitting antenna can be co-located with the second ground penetrating radar receiver, and the third transmitting antenna can be co-located with the third ground penetrating radar receiver. The first ground penetrating radar signal, the second ground penetrating radar signal, and the third ground penetrating radar signal can interact with subsurface feature by reflecting, refracting, or backscattering off the subsurface feature. The subsurface feature can be a karst or a pipeline, as shown in FIG. 1A.

At 406, the first ground penetrating radar return signal, the second ground penetrating radar return signal, and the third ground penetrating return signal are separated. The controller 108 separates the first return signal 124*a*, the second return signal 124*b*, and the third return signal 124*d*. The first return signal 124*a*, the second return signal 124*b*, and the third return signal 124*d* are blended as a result of the ground penetrating radar signals 118*a-d* being transmitted simultaneously.

At 408, a subterranean map is generated from the first ground penetrating radar return signal, the second ground penetrating radar return signal, and the third ground penetrating radar return signal. Generating the subterranean map from the first ground penetrating radar return signal, the second ground penetrating radar return signal, and the third ground penetrating radar return signal can include deblending the first ground penetrating radar return signal, the second ground penetrating radar return signal, and the third ground penetrating radar return signal by a least-square inversion module and a bandpass filter. Referring to FIG. 2, the least-square inversion module 132 and the bandpass filter 134 of the controller 108 deblend the return signals 124*a-b* and 124*d* and reduce noise caused by interferences.

Generating the subterranean map from the first ground penetrating radar return signal, the second ground penetrating radar return signal, and the third ground penetrating radar return signal can include flattening a common midpoint of the first ground penetrating radar return signal, the second ground penetrating radar return signal, and the third ground penetrating radar return signal by a normal moveout velocity analysis module. Referring to FIG. 2, the normal moveout velocity analysis module 138 can subsequently flatten the return signals 124*a-b* and 124*d*.

Although the following detailed description contains many specific details for purposes of illustration, it is understood that one of ordinary skill in the art will appreciate that many examples, variations, and alterations to the following details are within the scope and spirit of the disclosure. Accordingly, the example implementations described herein and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The invention claimed is:

1. A method of generating a subterranean map with a ground penetrating radar system, the ground penetrating radar system comprising:
   a plurality of ground penetrating radar vehicles, each ground penetrating radar vehicle comprising:
      a ground penetrating radar transmitter comprising a transmitting antenna; and
      a ground penetrating radar receiver; and
   a controller configured to operate the plurality of ground penetrating radar vehicles, the method comprising:
   determining a minimum distance between each of the ground penetrating radar vehicles of the plurality of ground penetrating radar vehicles based on an objective for a ground penetrating radar survey performed to generate the subterranean map;
   determining a minimum distance between two or more ground penetrating radar vehicles operating at the same frequency, wherein the minimum distance between two or more ground penetrating radar vehicles operating at the same frequency is greater than the minimum distance from the other ground penetrating radar vehicles operating at different frequencies;
   placing each of the ground penetrating radar vehicles of the plurality of ground penetrating radar vehicles at the minimum distance from the other ground penetrating radar vehicles and further placing each of the ground penetrating radar vehicles of the plurality of ground penetrating radar vehicles at the minimum distance from the other ground penetrating radar vehicles operating at the same frequency;
   simultaneously emitting a first ground penetrating radar signal from a first transmitting antenna at a first frequency bandwidth, a second ground penetrating radar signal from a second transmitting antenna at a second frequency bandwidth different than the first frequency bandwidth, and a third ground penetrating radar signal from a third transmitting antenna at a third frequency bandwidth different than the first frequency bandwidth and the second frequency bandwidth;

receiving a first ground penetrating radar return signal produced in response to the first ground penetrating radar signal interacting with a subsurface feature at a first ground penetrating radar receiver, a second ground penetrating radar return signal produced in response to the second ground penetrating radar signal interacting with the subsurface feature, and a third ground penetrating radar return signal produced in response to the third ground penetrating radar signal interacting with the subsurface feature at each of the first ground penetrating radar receiver, the second ground penetrating radar receiver, and the third ground penetrating radar receiver;

separating, by the controller, the first ground penetrating radar return signal, the second ground penetrating radar return signal, and the third ground penetrating return signal; and generating, by the controller, the subterranean map from the first ground penetrating radar return signal, the second ground penetrating radar return signal, and the third ground penetrating radar return signal.

2. The method of claim 1, wherein the first ground penetrating radar signal, the second ground penetrating radar signal, and the third ground penetrating radar signal interacting with the subsurface feature comprises the first ground penetrating radar signal, the second ground penetrating radar signal, and the third ground penetrating radar signal interacting with the subsurface feature by reflecting, refracting, or backscattering off the subsurface feature.

3. The method of claim 1, wherein the subsurface feature comprises a karst or a pipeline.

4. The method of claim 1, the each of the transmitting antennas is co-located with the respective ground penetrating radar receiver.

5. The method of claim 1, wherein generating the subterranean map from the first ground penetrating radar return signal, the second ground penetrating radar return signal, and the third ground penetrating radar return signal comprises deblending the first ground penetrating radar return signal, the second ground penetrating radar return signal, and the third ground penetrating radar return signal by a least-square inversion module, a median filtering, and a bandpass filter.

6. The method of claim 1, wherein generating the subterranean map from the first ground penetrating radar return signal, the second ground penetrating radar return signal, and the third ground penetrating radar return signal comprises flattening a common mid-point of the first ground penetrating radar return signal, the second ground penetrating radar return signal, and the third ground penetrating radar return signal by a normal moveout velocity analysis module.

7. The method of claim 1, further comprising determining the objective for the ground penetrating radar survey performed to generate the subterranean map, wherein the objective comprises performing at least one of a sparse survey or a dense survey.

8. The method of claim 7, further comprising changing the minimum distance based on the objective for the ground penetrating radar survey.

9. The method of claim 1, wherein the minimum distance between each of the ground penetrating radar vehicles of the plurality of ground penetrating radar vehicles is between 0.25 meters and 1 meter.

10. The method of claim 1, wherein the minimum distance between each of the ground penetrating radar vehicles of the plurality of ground penetrating radar vehicles is based on two adjacent ground penetrating radar vehicles which are operating at different frequencies.

11. The method of claim 1, wherein the ground penetrating radar transmitter and the ground penetrating radar receiver within each of the plurality of the ground penetrating radar vehicles are separated by a distance of between 5 centimeters and 1 meter.

* * * * *